3,331,693
ANTIFOULING PAINT
Wilbur S. Taylor, Norwalk, Conn., assignor to R. T. Vanderbilt Company Inc., New York, N.Y., a corporation of New York
No Drawing. Filed July 31, 1964, Ser. No. 386,747
20 Claims. (Cl. 106—15)

This application is a continuation-in-part of application, Ser. No. 225,138, filed on Sept. 20, 1962, now abandoned.

The present invention pertains to paints and more particularly to marine antifouling paints having exceptional longevity or antifouling efficacy.

Marine fouling organisms may either destroy, corrode or merely become attached to the underwater surfaces of marine structures; the last is a serious problem on the underwater surfaces of movable marine structures, e.g., heavy barnacle growth on a ship hull can slow the ship speed up to 50% and on a seaplane hull can make take-offs unsafe or impossible. These, however, are only representative examples of the great economic damage done by marine fouling organisms, including crustaceans (barnacles), mollusks (boring worms and boring clams), annelids (tubeworms), tunicates, algae, coelenterates, etc.

Many methods, including chemical, mechanical and electrical, have been considered in combating the marine fouling problem, but none has been entirely successful from the point of view of efficacy, convenience and economy.

Creosote impregnation has been used on wooden surfaces, but this is not satisfactory when paint is involved, since the creosote bleeds through the paint. Antifouling paints have been developed which include materials toxic to fouling organisms. One of these is a special paint formulation that provides for controlled release of cuprous oxide in sufficient quantity to be poisonous to the organisms. However, all of these paints are expensive, difficult to apply and must be applied at frequent intervals.

When marine paints are based upon cuprous oxide as the antifouling agent, an excessive amount of cuprous oxide is necessary in order to provide satisfactory lasting protection to the surface being coated with the cuprous oxide marine paint. Generally about 600 pounds to 800 pounds of cuprous oxide per 100 gallons of paint or from 50% to 65% of cuprous oxide based on the weight of the paint is necessary to provide satisfactory protection to a coated underwater surface for any extended period of time, such as from 6 to 9 months or longer. When smaller amounts of cuprous oxide are used as the antifouling agent in a marine paint, satisfactory protection for a coated underwater surface is not provided for a sufficiently long time. Thus, when a marine paint contains only 200 to 300 pounds of cuprous oxide per 100 gallons of paint or from 16% to 25% of cuprous oxide based on the weight of the paint, satisfactory protection of an underwater surface coated with such a paint is provided for only a short period of time, such as from 4 to 5 months.

It is, therefore, an object of the present invention to provide a marine antifouling paint which is highly efficacious in protecting underwater surfaces from marine fouling organisms.

It is a further object of the invention to provide a marine antifouling paint having exceptional longevity or efficacy against marine fouling organisms even though the paint contains a small amount only of cuprous oxide antifouling agent.

Another object of the invention is to provide a highly effective composite marine antifouling agent.

Still another object of the present invention is to provide an organic solvent-thinned or water-thinned marine antifouling paint.

The marine antifouling organic solvent-thinned and water-thinned paints of the present invention contain an unusually low amount of cuprous oxide as an antifouling agent, namely from about 200 to 300 pounds of cuprous oxide per 100 gallons of paint or from about 16% to about 30% by weight of cuprous oxide based on the total weight of the paint.

In order to extend appreciably the efficacy of the cuprous oxide antifouling agent in the marine paint of the invention there is also included therein 1,2,3-trichloro-4,6-dinitrobenzene. The 1,2,3-trichloro-4,6-dinitrobenzene is present in the marine antifouling paint in an amount from about 25 to about 300 pounds thereof per 100 gallons of paint or from about 2% to about 20% by weight of 1,2,3-trichloro-4,6-dinitrobenzene based on the weight of the paint.

This combination of cuprous oxide and 1,2,3-trichloro-4,6-dinitrobenzene is effective in preventing the fouling of underwater surfaces by marine fouling organisms for many months, whereas paints containing either toxicant alone lose their antifouling efficacy after a few short months' immersion in sea water. This cooperative effect is most unusual and surprising. Since antifouling activity is usually considered to depend on the leaching of toxicant from the paint, it would be expected that each toxicant present would leach out at its own rate, independent of that of any others present, and that the effective life of the paint would correspond to the effective life of the longest-lived toxicant present. Such is not the case. The combination of toxicants of the invention produces an effect much longer-lived than either toxicant alone and in many cases far more than any additive effect of the toxicants. These surprising facts are not understood, but they are self-evident.

The nature and the amounts of the components present in the marine paint to which this novel combination of cuprous oxide and 1,2,3-trichloro-4,6-dinitrobenzene is added are in no way critical to the present invention, since this composite antifouling agent has been found to be compatible with all marine solvent-thinned and water-thinned paints. Thus, the marine paints to which the composite antifouling agent may be added contain in conventional proportions a conventional film-forming base, that is, a binder of a type which releases toxicant at a controlled rate.

The binder in an antifouling paint may be one or more organic materials which form a film which is stable in water, yet capable of releasing toxicant at a controlled rate, i.e., a rate sufficient to kill or to discourage the settling of fouling organisms thereon. Typical binders include rosin; the modified esters of rosin or modified rosins prepared, for example, by the treatment of rosin with glycerol or pentaerythritol and then with drying oil or semi-drying oil fatty acids; hydrogenated lower alkyl esters of rosin such as the hydrogenated methyl, ethyl and propyl esters of rosin; resinous vinyl polymers such as vinyl chloride homopolymers and copolymers, vinyl acetate homopolymers and copolymers, styrene-butadiene copolymers and polyacrylate resins; blown fish oil; asphalt; tar oils; and rubber polymers such as chlorinated rubber, butadiene homopolymers and copolymers, butyl rubber, halogenated butyl rubber, neoprene, and polyisoprene. Generally two or more of these binders are used in combination. Typical combinations are rosin with rosin derivatives, polyvinyl chloride with rosin, and rosin with blown fish oil. A preferred combination is rosin and hydrogenated methyl ester of rosin in a ratio between about 2.3:1 to about 3.5:1, but with 400 lbs. of toxicant or more the ratio may be low as 2:1. Some of these binders are more suited to formulating in organic solvents, some are more suited to formulating in water suspension, while some may be formulated in either water or organic solvents.

Chemical plasticizers may be added to the resinous and rubbery binders in accordance with principles well known to those skilled in the art (U.S. Pat. No. 2,579,610). For example, tricresyl phosphate, dioctyl phthalate, didecyl adipate, dioctyl azelate, epoxidized plasticizers, polymeric plasticizers, and the like, may be added to polyvinyl chloride and other vinyl resins to obtain the physical properties desired in the paint film.

The antifouling marine paints of the invention will also generally contain the usual inert pigments which term as used herein includes extenders, fillers and thickeners which are well known in the art, such as titanium dioxide, carbon black, magnesium silicate, calcium carbonate, talcs, clay, red and black iron oxide, diatomaceous earth, bentonite, etc. These pigments are utilized in conventional amounts.

The marine antifouling paint will also contain as diluents conventional volatile solvents or thinners which may or may not also be solvents. In a solvent-thinned paint, the diluent may be toluene, xylene, turpentine, mineral spirits, turpentine substitutes and the like. In a water-thinned paint, the diluent is water.

Other ingredients optionally included in the water-thinned paint of the invention are conventional wetting and dispersing agents, thickeners and protective colloids, stabilizers and coupling agents. For instance, suitable dispersing agents for vinyl acetate copolymer water-thinned paints include aliphatic-substituted butynediol, lecithin and nonyl phenyl polyethylene glycol ether. The thickeners and protective colloids include materials such as hydroxymethyl cellulose, bentonite clay, polyacrylic thickeners and similar water-compatible thickeners. Glycol ethers, e.g., diethylene glycol monoethyl ether, may also be added to the water-thinned paint as a coupler, as a mutual solvent for binder and water, and as a coalescing agent for the paint film upon drying.

The preferred ranges for the ingredients in a water-thinned paint and the preferred ranges for the ingredients in a solvent-thinned paint are indicated in Table A.

paint was free from both cuprous oxide and 1,2,3-trichloro-4,6-dinitrobenzene. This control paint is Example 1 in Table I, Example 7 in Table II, Example 14 in Table III, Example 22 in Table IV, Example 29 in Table V and Example 34 in Table VI set forth below.

Comparative paints were compounded containing from 50 to 200 pounds of 1,2,3-trichloro-4,6-dinitrobenzene per 100 gallons of paint or from about 4% to about 17% by weight thereof based on the weight of the paint. In order to keep the volume of solids constant in comparative paints, a volume of magnesium silicate filler equal to that of the trichlorodinitrobenzene or other toxicant added was omitted from the base or control formula. Equal volume formulations were used for comparative paints because volume of solids present in a vehicle had to be kept about the same to obtain comparable viscosity, spreadability, dispersion, etc. Substituting heavy cuprous oxide for magnesium silicate in the paints made a noticeable difference in the weight and percentage composition of some of the rosin paints, yet volumes and paint characteristics were equal. The comparative paints containing varying amounts of the trichlorodinitrobenzene are Example 2 in Table I, Example 8 in Table II, Example 15 in Table III, Example 23 in Table IV, Example 30 in Table V and Example 35 in Table VI set forth below.

A further number of comparative paints were prepared containing from 200 to 300 pounds of cuprous oxide per 100 gallons of paint or from about 16% to about 25% by weight of cuprous oxide based on the weight of the paint. These comparative paints are Example 3 in Table I, Example 9 in Table II, Example 16 in Table III, Example 24 in Table IV, Example 31 in Table V and Example 36 in Table VI.

A large number of marine antifouling paints of the invention containing the composite antifouling agent of the invention, namely cuprous oxide and 1,2,3-trichloro-4,6-dinitrobenzene, were also prepared wherein the amounts of cuprous oxide and the trichlorodinitrobenzene were varied. Variations were also made in the amounts of binders and solvent of the paints. These numerous paints of the invention are Examples 4 through 6 in Table I, Examples 10 through 13 in Table II, Examples 17 through 21 in Table III, Examples 25 through 28 in

TABLE A

| Ingredient | Preferred Range for Water-thinned Paints | | Preferred Range for Solvent-thinned Paints | |
|---|---|---|---|---|
| | Lbs./100 gals. | Percent by wt. | Lbs./100 gals. | Percent by wt. |
| 1,2,3-Trichloro-4,6-dinitrobenzene | 25 to 100 | 2 to 10 | 50 to 200 | 4 to 17 |
| Cuprous Oxide | 200 to 300 | 17 to 30 | 200 to 300 | 16 to 25 |
| Binder | 100 to 200 | 10 to 20 | 360 to 450 | 29 to 40 |
| Pigment | 50 to 100 | 5 to 10 | 100 to 400 | 8 to 31 |
| Diluent | 400 to 600 | 40 to 60 | 170 to 250 | 13 to 21 |

There are several advantages in using a water-thinned marine antifouling paint as compared with a solvent-thinned antifouling paint. The water-thinned paint can be applied to a cleaned boat bottom which is only partially dried. It can be applied without any fire hazard, and without toxicity due to solvent vapors. The vapor pressure of the solvent, water, is so low that there is no danger of decreasing to dangerous levels the air supply in the confined working space beneath hulls as sometimes happens when organic solvent-thinned paints are used.

The marine antifouling paint of the invention is illustrated by numerous examples presented below which are exemplary only and do not constitute limitations of the compositions of the invention.

Several series of equal volume solvent-thinned paint formulations (Examples 1–38) were compounded in the usual manner. One paint was prepared as a control, which Table IV, Examples 32 and 33 in Table V and Examples 37 and 38 in Table VI.

The control paint, the comparative paints and the various paints of the invention were separately brushed onto 8 inch by 10 inch Masonite panels which were submerged for 15 months in the sea at Miami, Florida. The panels were examined after each month of submersion and fouling by all types of marine fouling organisms was recorded.

In this severe antifouling performance and longevity test, ratings were given on a basis of 0 to 100%. A score of 100% indicates the absence of fouling and a good paint film condition. The presence of any fouling reduces the score to 95%. Then the number of individual organisms present and the percentage of surface covered by colonial forms is subtracted from 95% to get the percentage rating. A rating of 80% to 85% or higher is considered satisfactory. It will be noted in the ratings set forth in the tables below that on occasion a low rating may be followed the next month by a higher rating. It should be understood that through the action of the paint film it is possible for organisms to be killed or otherwise forced to detach. In this way the rating will rise again after once having fallen. A rating of 70% or lower is considered a practical failure and a rating of 0% means that the panel is completely covered by fouling organisms. If the rating is not indicated in the tables for 12, 13, 14 or 15 months, it is 0%.

In the tables set forth below the abbreviation "Lb." stands for pounds per 100 gallons of paint and the abbreviation "%" stands for percent by weight based on the weight of the paint.

Table I compares equal volume solvent-thinned antifouling paints containing 50 pounds of trichlorodinitrobenzene and 200 pounds of cuprous oxide per 100 gallons of paint with appropriate controls. Example 1 was a control which contained no cuprous oxide and none of the trichlorodinitrobenzene. Comparative Example 2 contained 50 pounds of the trichlorodinitrobenzene per 100 gallons of the paint and comparative Example 3 contained 200 pounds of cuprous oxide per 100 gallons of the paint. Examples 4 through 6 therein illustrating the invention contained both 50 pounds of the trichlorodinitrobenzene and 200 pounds of cuprous oxide per 100 gallons of the paint, and they contained varying proportions of the binders.

It will be noted that control paint 1 was effective, i.e., gave a satisfactory antifouling rating of 80% or higher, for only 1 month. Comparative paint 2 was effective for only 2 months and comparative paint 3 was effective for only 4 months. On the other hand, paints 4 through 6 of the invention were effective for markedly extended periods ranging from 7 to 10 months. Paint 5 gave especially high ratings even at the end of 10 months' exposure. Although there is no reason to expect the life of the antifouling effect to be any longer than the life of the longest-lived single toxicant present, the effect of the combination of toxicants in the invention is additive and may be considerably more than additive.

TABLE I

| Example No. | 1 (Control) | | 2 | | 3 | | 4 | | 5 | | 6 | |
|---|---|---|---|---|---|---|---|---|---|---|---|---|
| Amount | Lb. | Percent | Lb. | Percent | Lb. | Percent | Lb. | Percent | Lb. | Percent | Lb. | Percent |
| 1,2,3-Trichloro-4,6-dinitrobenzene | | | 50 | 4.3 | | | 50 | 4.0 | 50 | 3.9 | 50 | 4.0 |
| Cuprous Oxide | | | | | 200 | 15.4 | 200 | 15.8 | 200 | 15.8 | 200 | 15.9 |
| Magnesium Silicate | 476 | 40 | 393 | 33.9 | 381 | 29.4 | 298 | 23.6 | 298 | 23.6 | 298 | 23.8 |
| Red Iron Oxide | 100 | 8.4 | 100 | 8.6 | 100 | 7.7 | 100 | 7.9 | 100 | 7.9 | 100 | 8.0 |
| Gum Rosin | 270 | 22.7 | 270 | 23.4 | 270 | 20.9 | 270 | 21.4 | 315 | 25.0 | 315 | 25.1 |
| Hercolyn [1] | 135 | 11.3 | 135 | 11.7 | 135 | 10.4 | 135 | 10.7 | 90 | 7.1 | 45 | 3.6 |
| Mineral Spirits | 210 | 17.6 | 210 | 18.1 | 210 | 16.2 | 210 | 16.6 | 212 | 16.7 | 246 | 19.6 |
| Total | 1,191 | 100 | 1,158 | 100 | 1,296 | 100 | 1,263 | 100 | 1,265 | 100 | 1,254 | 100 |

[1] Treated rosin—hydrogenated methyl ester of rosin.

| Months' Exposure | Percent Prevention of Fouling | | | | | |
|---|---|---|---|---|---|---|
| 1 | 93 | 90 | 95 | 95 | 95 | 100 |
| 2 | 35 | 80 | 90 | 85 | 100 | 100 |
| 3 | 30 | 55 | 90 | 77 | 100 | 100 |
| 4 | 0 | 11 | 90 | 81 | 100 | 100 |
| 5 | 0 | 0 | 0 | 77 | 86 | 77 |
| 6 | 0 | 0 | 0 | 43 | 77 | 68 |
| 7 | 0 | 0 | 0 | 80 | 100 | 86 |
| 8 | 0 | 0 | 0 | 33 | 100 | 55 |
| 9 | 0 | 0 | 0 | 41 | 100 | 28 |
| 10 | 0 | 0 | 0 | 62 | 100 | 0 |
| 11 | 0 | 0 | 0 | 0 | 59 | 0 |
| 12 | 0 | 0 | 0 | 0 | 0 | 0 |

TABLE II

| Example No. | 7 (Control) | | 8 | | 9 | | 9 | | 10 | | 11 | | 13 | |
|---|---|---|---|---|---|---|---|---|---|---|---|---|---|---|
| Amount | Lb. | Percent | Lb. | Percent | Lb. | Percent | Lb. | Percent | Lb. | Percent | Lb. | Percent | Lb. | Percent |
| 1,2,3-Trichloro-4,6-dinitrobenzene | | | 100 | 8.9 | | | 100 | 8.1 | 100 | 8.2 | 100 | 8.2 | 100 | 8.2 |
| Cuprous Oxide | | | | | 200 | 15.4 | 200 | 16.2 | 200 | 16.4 | 200 | 16.4 | 200 | 16.4 |
| Magnesium Silicate | 476 | 40 | 310 | 27.5 | 381 | 29.4 | 214 | 17.5 | 214 | 17.5 | 214 | 17.6 | 214 | 17.6 |
| Red Iron Oxide | 100 | 8.4 | 100 | 8.9 | 100 | 7.7 | 100 | 8.1 | 100 | 8.2 | 100 | 8.2 | 100 | 8.2 |
| Gum Rosin | 270 | 22.7 | 270 | 24.0 | 270 | 20.9 | 315 | 25.6 | 315 | 25.8 | 270 | 22.1 | 225 | 18.5 |
| Hercolyn [1] | 135 | 11.3 | 135 | 12.0 | 135 | 10.4 | 90 | 7.3 | 45 | 3.7 | 90 | 7.4 | 135 | 11.1 |
| Mineral Spirits | 210 | 17.6 | 210 | 18.7 | 210 | 16.2 | 212 | 17.2 | 246 | 20.2 | 245 | 20.1 | 243 | 20.0 |
| Total | 1,191 | 100 | 1,125 | 100 | 1,296 | 100 | 1,231 | 100 | 1,220 | 100 | 1,219 | 100 | 1,217 | 100 |

[1] Treated rosin.

| Months' Exposure | Percent Prevention of Fouling | | | | | | |
|---|---|---|---|---|---|---|---|
| 1 | 93 | 92 | 95 | 95 | 95 | 95 | 95 |
| 2 | 35 | 60 | 90 | 95 | 100 | 95 | 100 |
| 3 | 30 | 0 | 90 | 95 | 100 | 95 | 100 |
| 4 | 0 | 43 | 90 | 95 | 100 | 77 | 90 |
| 5 | 0 | 0 | 0 | 93 | 100 | 90 | 85 |
| 6 | 0 | 0 | 0 | 91 | 91 | 84 | 85 |
| 7 | 0 | 0 | 0 | 85 | 75 | 53 | 52 |
| 8 | 0 | 0 | 0 | 29 | 0 | 0 | 0 |
| 9 | 0 | 0 | 0 | 38 | 0 | 0 | 0 |
| 10 | 0 | 0 | 0 | 40 | 0 | 0 | 0 |
| 11 | 0 | 0 | 0 | 0 | 0 | 0 | 0 |

Table II compares equal volume solvent-thinned antifouling paints containing 100 pounds of trichlorodinitrobenzene and 200 pounds of cuprous oxide per 100 gallons with appropriate controls. Example 7 was a control paint which was free from cuprous oxide and the trichlorodinitrobenzene. The comparative paint in Example 8 contained 100 pounds of the trichlorodinitrobenzene per 100 gallons and the comparative paint of Example 9 contained 200 pounds of cuprous oxide per 100 gallons of the paint. Examples 10 through 13 of the invention contained both 100 pounds of the trichlorodinitrobenzene and 200 pounds of cuprous oxide per 100 gallons.

The control paint was effective for only 1 month. The comparative paint 8 also was effective for only 1 month and the comparative paint 9 was effective for only 4 months. On the other hand, paints 10 through 13 of the invention were effective for 6 to 7 months.

Table III compares equal volume solvent-thinned antifouling paints containing 200 pounds of trichlorodinitrobenzene and 200 pounds of cuprous oxide per 100 gallons with appropriate controls. Example 14 was a control paint which was free from cuprous oxide and the trichlorodinitrobenzene. The comparative paint in Example 15 contained 200 pounds of the trichlorodinitrobenzene per 100 gallons and the comparative paint of Example 16 contained 200 pounds of cuprous oxide per 100 gallons. Examples 17 through 21 of the invention contained both 200 pounds of the trichlorodinitrobenzene and 200 pounds of cuprous oxide per 100 gallons of the paint.

The control paint was effective for only 1 month. The comparative paint 15 was effective for only 1 month and the comparative paint 16 was effective for only 4 months. On the other hand, paints 17 through 21 of the invention were effective for extended periods of 7 to 10 months. Paint 19 was particularly effective.

TABLE III

| Example No. | 14 (Control) | | 15 | | 16 | | 17 | | 18 | | 19 | | 20 | | 21 | |
|---|---|---|---|---|---|---|---|---|---|---|---|---|---|---|---|---|
| Amount | Lb. | Percent | Lb. | Percent | Lb. | Percent | Lb. | Percent | Lb. | Percent | Lb. | Percent | Lb. | Percent | Lb. | Percent |
| 1,2,3-Trichloro-4,6-dinitrobenzene | | | 200 | 18.9 | | | 200 | 17.2 | 200 | 17.0 | 200 | 17.2 | 200 | 17.3 | 200 | 17.3 |
| Cuprous Oxide | | | | | 200 | 15.4 | 200 | 17.2 | 200 | 17.0 | 200 | 17.2 | 200 | 17.3 | 200 | 17.3 |
| Magnesium Silicate | 476 | 40 | 143 | 13.5 | 381 | 29.4 | 48 | 4.1 | 48 | 4.1 | 48 | 4.1 | 48 | 4.2 | 48 | 4.2 |
| Red Iron Oxide | 100 | 8.4 | 100 | 9.5 | 100 | 7.7 | 100 | 8.6 | 100 | 8.5 | 100 | 8.6 | 100 | 8.7 | 100 | 8.7 |
| Gum Rosin | 270 | 22.7 | 270 | 25.6 | 270 | 20.9 | 270 | 23.2 | 315 | 26.8 | 315 | 27.0 | 315 | 27.3 | 270 | 23.4 |
| Hercolyn [1] | 135 | 11.3 | 135 | 12.7 | 135 | 10.4 | 135 | 11.6 | 135 | 11.5 | 90 | 7.7 | 45 | 3.9 | 90 | 7.8 |
| Mineral Spirits | 210 | 17.6 | 210 | 19.8 | 210 | 16.2 | 210 | 18.1 | 177 | 15.1 | 212 | 18.2 | 246 | 21.3 | 245 | 21.3 |
| Total | 1,191 | 100 | 1,058 | 100 | 1,296 | 100 | 1,163 | 100 | 1,175 | 100 | 1,165 | 100 | 1,154 | 100 | 1,153 | 100 |

[1] Treated rosin.

| Months' Exposure | Percent Prevention of Fouling | | | | | | | |
|---|---|---|---|---|---|---|---|---|
| 1 | 93 | 93 | 95 | 95 | 100 | 100 | 95 | 95 |
| 2 | 35 | 70 | 90 | 98 | 95 | 98 | 100 | 95 |
| 3 | 30 | 40 | 90 | 98 | 95 | 98 | 100 | 95 |
| 4 | 0 | 0 | 90 | 98 | 95 | 98 | 100 | 95 |
| 5 | 0 | 0 | 0 | 95 | 90 | 95 | 94 | 95 |
| 6 | 0 | 0 | 0 | 100 | 100 | 100 | 95 | 100 |
| 7 | 0 | 0 | 0 | 90 | 85 | 100 | 81 | 90 |
| 8 | 0 | 0 | 0 | 43 | 56 | 93 | 51 | 75 |
| 9 | 0 | 0 | 0 | 48 | 46 | 93 | 25 | 71 |
| 10 | 0 | 0 | 0 | 21 | 41 | 100 | 0 | 36 |
| 11 | 0 | 0 | 0 | 0 | 0 | 14 | 0 | 0 |

TABLE IV

| Example No. | 22 (Control) | | 23 | | 24 | | 25 | | 26 | | 27 | | 28 | |
|---|---|---|---|---|---|---|---|---|---|---|---|---|---|---|
| Amount | Lb. | Percent | Lb. | Percent | Lb. | Percent | Lb. | Percent | Lb. | Percent | Lb. | Percent | Lb. | Percent |
| 1,2,3-Trichloro-4,6-dinitrobenzene | | | 50 | 4.3 | | | 50 | 3.8 | 50 | 3.8 | 50 | 3.8 | 50 | 3.8 |
| Cuprous Oxide | | | | | 300 | 22.3 | 300 | 22.8 | 300 | 22.6 | 300 | 22.8 | 300 | 23.0 |
| Magnesium Silicate | 476 | 40 | 393 | 33.9 | 333 | 24.7 | 250 | 19.0 | 250 | 18.8 | 250 | 19.0 | 250 | 19.2 |
| Red Iron Oxide | 100 | 8.4 | 100 | 8.6 | 100 | 7.4 | 100 | 7.6 | 100 | 7.5 | 100 | 7.6 | 100 | 7.7 |
| Gum Rosin | 270 | 22.7 | 270 | 23.4 | 270 | 20.0 | 270 | 20.5 | 315 | 23.7 | 315 | 23.9 | 315 | 24.0 |
| Hercolyn [1] | 135 | 11.3 | 135 | 11.7 | 135 | 10.0 | 135 | 10.3 | 135 | 10.2 | 90 | 6.8 | 45 | 3.4 |
| Mineral Spirits | 210 | 17.6 | 210 | 18.1 | 210 | 15.6 | 210 | 16.0 | 177 | 13.4 | 212 | 16.1 | 246 | 18.9 |
| Total | 1,191 | 100 | 1,158 | 100 | 1,348 | 100 | 1,315 | 100 | 1,327 | 100 | 1,317 | 100 | 1,306 | 100 |

[1] Treated rosin.

| Months' Exposure | Percent Prevention of Fouling | | | | | | |
|---|---|---|---|---|---|---|---|
| 1 | 93 | 90 | 94 | 95 | 95 | 100 | 100 |
| 2 | 35 | 80 | 90 | 100 | 95 | 100 | 100 |
| 3 | 30 | 55 | 90 | 86 | 100 | 100 | 100 |
| 4 | 0 | 11 | 90 | 77 | 100 | 100 | 100 |
| 5 | 0 | 0 | 90 | 90 | 93 | 94 | 86 |
| 6 | 0 | 0 | 75 | 90 | 93 | 100 | 82 |
| 7 | 0 | 0 | 0 | 85 | 100 | 100 | 81 |
| 8 | 0 | 0 | 0 | 65 | 86 | 93 | 41 |
| 9 | 0 | 0 | 0 | 62 | 93 | 93 | 0 |
| 10 | 0 | 0 | 0 | 58 | 100 | 93 | 0 |
| 11 | 0 | 0 | 0 | 0 | 100 | 100 | 0 |
| 12 | 0 | 0 | 0 | 0 | 68 | 0 | 0 |
| 13 | 0 | 0 | 0 | 0 | 57 | 18 | 0 |
| 14 | 0 | 0 | 0 | 0 | 50 | 50 | 0 |
| 15 | 0 | 0 | 0 | 0 | 50 | 50 | 0 |

Table IV compares equal volume solvent-thinned antifouling paints containing 50 pounds of trichlorodinitrobenzene and 300 pounds of cuprous oxide per 100 gallons with appropriate controls. Example 22 was a control paint which was free from cuprous oxide and the trichlorodinitrobenzene. The comparative paint in Example 23 contained 50 pounds of the trichlorodinitrobenzene per 100 gallons and the comparative paint of Example 24 contained 300 pounds of cuprous oxide per 100 gallons. Examples 25 through 28 of the invention contained both 50 pounds of the trichlorodinitrobenzene and 300 pounds of cuprous oxide per 100 gallons of the paint.

The control paint was effective for only 1 month. The comparative paint 23 was effective for only 2 months and the comparative paint 24 was effective for only 5 months. On the other hand, paints 25 through 28 of the invention were effective for the extended periods of 7 to 11 months. Paints 26 and 27 were especially effective.

Table V compares equal volume solvent-thinned antifouling paints containing 100 pounds of trichlorodinitrobenzene and 300 pounds of cuprous oxide with appropriate controls. Example 29 was a control paint which was free from cuprous oxide and the trichlorodinitrobenzene. The comparative paint in Example 30 contained 100 pounds of the trichlorodinitrobenzene per 100 gallons and the comparative paint of Example 31 contained 300 pounds of cuprous oxide per 100 gallons. Examples 32 and 33 of the invention contained both 100 pounds of the trichlorodinitrobenzene and 300 pounds of cuprous oxide per 100 gallons of the paint.

The control paint was effective for only 1 month. The comparative paint 30 was effective for only 1 month and the comparative paint 31 was effective for only 5 months. On the other hand, paints 32 and 33 of the invention were especially good, being effective for 11 months.

TABLE V

| Example No. | 29 (Control) | | 30 | | 31 | | 32 | | 33 | |
|---|---|---|---|---|---|---|---|---|---|---|
| Amount | Lb. | Percent | Lb. | Percent | Lb. | Percent | Lb. | Percent | Lb. | Percent |
| 1,2,3,-Trichloro-4,6-dinitrobenzene | | | 100 | 8.9 | | | 100 | 7.7 | 100 | 7.8 |
| Cuprous Oxide | | | | | 300 | 22.3 | 300 | 23.2 | 300 | 23.4 |
| Magnesium Silicate | 476 | 40 | 310 | 27.6 | 333 | 24.7 | 167 | 12.9 | 167 | 13.0 |
| Red Iron Oxide | 100 | 8.4 | 100 | 8.9 | 100 | 7.4 | 100 | 7.7 | 100 | 7.8 |
| Gum Rosin | 270 | 22.7 | 270 | 24.0 | 270 | 20.0 | 315 | 24.4 | 315 | 24.5 |
| Hercolyn [1] | 135 | 11.3 | 135 | 12.0 | 135 | 10.0 | 135 | 10.4 | 90 | 7.0 |
| Mineral Spirits | 210 | 17.6 | 210 | 18.6 | 210 | 15.6 | 177 | 13.7 | 212 | 16.5 |
| Total | 1,191 | 100 | 1,125 | 100 | 1,348 | 100 | 1,294 | 100 | 1,284 | 100 |

[1] Treated rosin.

| Months' Exposure | Percent Prevention of Fouling | | | | |
|---|---|---|---|---|---|
| 1 | 93 | 92 | 94 | 95 | 95 |
| 2 | 35 | 60 | 90 | 100 | 100 |
| 3 | 30 | 0 | 90 | 100 | 100 |
| 4 | 0 | 43 | 90 | 100 | 100 |
| 5 | 0 | 0 | 90 | 100 | 100 |
| 6 | 0 | 0 | 75 | 100 | 100 |
| 7 | 0 | 0 | 0 | 100 | 100 |
| 8 | 0 | 0 | 0 | 93 | 100 |
| 9 | 0 | 0 | 0 | 90 | 100 |
| 10 | 0 | 0 | 0 | 93 | 100 |
| 11 | 0 | 0 | 0 | 100 | 100 |
| 12 | 0 | 0 | 0 | 23 | 14 |
| 13 | 0 | 0 | 0 | 12 | 22 |
| 14 | 0 | 0 | 0 | 0 | 17 |
| 15 | 0 | 0 | 0 | 14 | 50 |

TABLE VI

| Example No. | 34 (Control) | | 35 | | 36 | | 37 | | 38 | |
|---|---|---|---|---|---|---|---|---|---|---|
| Amount | Lb. | Percent | Lb. | Percent | Lb. | Percent | Lb. | Percent | Lb. | Percent |
| 1,2,3-Trichloro-4,6-dinitrobenzene | | | 200 | 18.9 | | | 200 | 16.5 | 200 | 16.4 |
| Cuprous Oxide | | | | | 300 | 22.3 | 300 | 24.7 | 300 | 24.7 |
| Magnesium Silicate | 476 | 40 | 143 | 13.5 | 333 | 24.7 | | | | |
| Red Iron Oxide | 100 | 8.4 | 100 | 9.5 | 100 | 7.4 | 100 | 8.2 | 100 | 8.2 |
| Gum Rosin | 270 | 22.7 | 270 | 25.5 | 270 | 20.0 | 270 | 22.2 | 315 | 25.9 |
| Hercolyn [1] | 135 | 11.3 | 135 | 12.8 | 135 | 10.0 | 135 | 11.1 | 90 | 7.4 |
| Mineral Spirits | 210 | 17.6 | 210 | 19.8 | 210 | 15.6 | 210 | 17.3 | 212 | 17.4 |
| Total | 1,191 | 100 | 1,058 | 100 | 1,348 | 100 | 1,215 | 100 | 1,217 | 100 |

[1] Treated rosin.

| Months' Exposure | Percent Prevention of Fouling | | | | |
|---|---|---|---|---|---|
| 1 | 93 | 93 | 94 | 95 | 100 |
| 2 | 35 | 70 | 90 | 100 | 100 |
| 3 | 30 | 40 | 90 | 95 | 100 |
| 4 | 0 | 0 | 90 | 100 | 100 |
| 5 | 0 | 0 | 90 | 100 | 100 |
| 6 | 0 | 0 | 75 | 100 | 100 |
| 7 | 0 | 0 | 0 | 100 | 100 |
| 8 | 0 | 0 | 0 | 93 | 100 |
| 9 | 0 | 0 | 0 | 90 | 100 |
| 10 | 0 | 0 | 0 | 84 | 100 |
| 11 | 0 | 0 | 0 | 0 | 100 |
| 12 | 0 | 0 | 0 | 0 | 68 |
| 13 | 0 | 0 | 0 | 0 | 48 |
| 14 | 0 | 0 | 0 | 0 | 50 |
| 15 | 0 | 0 | 0 | 0 | 50 |

Table VI compares equal volume solvent-thinned antifouling paints containing 200 pounds of trichlorodinitrobenzene and 300 pounds of cuprous oxide per 100 gallons with appropriate controls. Example 34 was a control paint which was free from cuprous oxide and the trichlorodinitrobenzene. The comparative paint in Example 35 contained 200 pounds of the trichlorodinitrobenzene per 100 gallons and the comparative paint of Example 36 contained 300 pounds of cuprous oxide per 100 gallons. Examples 37 and 38 of the invention contained both 200 pounds of the trichlorodinitrobenzene and 300 pounds of cuprous oxide per 100 gallons of the paint.

The control paint 34 was effective for only 1 month. The comparative paint 35 was effective for only 1 month and the comparative paint 36 was effective for only 5 months. On the other hand, paints 37 and 38 of the invention were especially good, being effective for the remarkably extended periods of 10 and 11 months, respectively.

The above data show that the solvent-thinned paints of the invention set forth in Examples 5, 19, 26, 27, 32, 33, 37 and 38 were effective for the remarkable periods of 9 to 11 months under the extreme fouling conditions existing in the tropical sea waters adjacent Miami, Florida.

A number of water-thinned paint formulations (Examples 39 to 51) were prepared in which the binder was an internally-plasticized vinyl acetate copolymer, Norvan PR-30 brand of 55% nonvolatile dispersion of vinyl acetate copolymerized with an ethylenically unsaturated polymerizable ester. Two levels of binder were used. Toxicants and pigments were added as dispersions in water: trichlorodinitrobenzene as a 50% dispersion, titanium dioxide pigment as a 70% dispersion, cuprous oxide as a 60% dispersion, but the magnesium silicate was added as a finely divided powder. Essentially equal volume paints were prepared by decreasing the amount of magnesium silicate used in the control paint by the amount of toxicant added. In the tables below, the components are reported on the dry basis and the weight of water in each formulation is the sum of that in the dispersions used and that added to bring the volume to 100 gallons.

One paint for each level of binder used and free from both cuprous oxide and trichlorodinitrobenzene was prepared as a control for that series. These control paints are Examples 39 in Table VII and 47 in Table VIII.

A number of comparative paints were compounded containing 25 to 186 pounds of 1,2,3-trichloro-4,6-dinitrobenzene per 100 gallons of paint or from about 2% to about 19% by weight thereof based on the weight of the paint. These comparative paints are Examples 40 through 43 in Table VII and Examples 48 through 50 in Table VIII.

A number of marine antifouling paints were also prepared containing the composite antifouling agent of the present invention, i.e., cuprous oxide and 1,2,3-trichloro-4,6-dinitrobenzene. The paints of the invention are Examples 44 through 46 in Table VII and Example 51 in Table VIII.

The various water-thinned paints were tested on Masonite panels submerged in the sea at Miami, Florida and were rated in the manner described above for solvent-thinned paints.

Table VII compares equal volume water-thinned antifouling paints containing varying amounts of trichlorodinitrobenzene and cuprous oxide with appropriate controls. Example 39, which was the control, contained no cuprous oxide and no 1,2,3-trichloro-4,6-dinitrobenzene. Comparative Examples 40, 41, 42 and 43 contained 25, 65, 146 and 186 pounds, respectively, of 1,2,3-trichloro-4,6-dinitrobenzene per 100 gallons of paint. Examples 44, 45 and 46 illustrating the invention contained 25, 50 and 25 pounds, respectively, of 1,2,3-trichloro-4,6-dinitrobenzene and 200, 200 and 301 pounds, respectively, of cuprous oxide per 100 gallons of paint. All the paints contained 118 pounds of binder per 100 gallons.

As indicated in Table VII, control paint 39 failed to control fouling for even one month. Similarly, comparative paints 40, 41, 42 and 43 failed to control fouling for even one month. Conversely, paints 44, 45 and 46 of the invention were still effective even after exposure for 7 months.

TABLE VII

| Example No. | 39 (Control) | | 40 | | 41 | | 42 | | 43 | | 44 | | 45 | | 46 | |
|---|---|---|---|---|---|---|---|---|---|---|---|---|---|---|---|---|
| Amount | Lb. | Percent | Lb. | Percent | Lb. | Percent | Lb. | Percent | Lb. | Percent | Lb. | Percent | Lb. | Percent | Lb. | Percent |
| 1,2,3-Trichloro-4,6-dinitrobenzene | | | 25 | 2.3 | 65 | 6.0 | 146 | 14.2 | 186 | 18.6 | 25 | 2.2 | 50 | 4.5 | 25 | 2.1 |
| Cuprous Oxide | | | | | | | | | | | 200 | 18.0 | 200 | 17.8 | 301 | 25.1 |
| Magnesium Silicate | 313 | 27.8 | 271 | 24.5 | 203 | 18.8 | 68 | 6.6 | | | | | | | | |
| Titanium Dioxide | 100 | 8.9 | 100 | 9.0 | 100 | 9.3 | 100 | 9.8 | 100 | 10.0 | 100 | 9.0 | 100 | 8.9 | 100 | 8.3 |
| Vinyl acetate copolymer binder | 118 | 10.5 | 118 | 10.6 | 118 | 10.9 | 118 | 11.5 | 118 | 11.8 | 118 | 10.6 | 118 | 10.5 | 118 | 9.8 |
| Water | 567 | 50.4 | 567 | 51.2 | 568 | 52.5 | 567 | 55.2 | 568 | 56.9 | 643 | 57.8 | 627 | 55.9 | 630 | 52.4 |
| Dispersing agents [1] | 27 | 2.4 | 27 | 2.4 | 27 | 2.5 | 27 | 2.6 | 27 | 2.7 | 27 | 2.4 | 27 | 2.4 | 27 | 2.3 |
| Total | 1,125 | 100 | 1,108 | 100 | 1,081 | 100 | 1,026 | 100 | 999 | 100 | 1,113 | 100 | 1,122 | 100 | 1,201 | 100 |

[1] Dispersing agents and other additives, in pounds of dry material per 100 gallons: Cellosize brand of hydroxymethyl cellulose 5, Surfynol brand of aliphatic-substituted butynediol 2, Tergitol brand of nonyl phenyl polyethylene glycol ether 3, lecithin 2, and Ethyl Carbitol brand of diethylene glycol monoethyl ether 15.

| Months' Exposure | Percent Prevention of Fouling | | | | | | | |
|---|---|---|---|---|---|---|---|---|
| 1 | 0 | 0 | 0 | 0 | 0 | 100 | 100 | 100 |
| 2 | 0 | 0 | 0 | 0 | 0 | 83 | 100 | 100 |
| 3 | 0 | 0 | 0 | 0 | 0 | 100 | 100 | 100 |
| 4 | 0 | 0 | 0 | 0 | 0 | 100 | 100 | 100 |
| 5 | 0 | 0 | 0 | 0 | 0 | 85 | 100 | 100 |
| 6 | 0 | 0 | 0 | 0 | 0 | 90 | 100 | 100 |
| 7 | 0 | 0 | 0 | 0 | 0 | 89 | 83 | 95 |

Table VIII compares equal volume paints containing 147 pounds of binder per 100 gallons and varying quantities of trichlorodinitrobenzene and cuprous oxide with appropriate controls. The control, which was free from both cuprous oxide and 1,2,3-trichloro-4,6-dinitrobenzene, was Example 47. The comparative paints in Examples 48, 49 and 50 contained 25, 60 and 112 pounds, respectively, of 1,2,3-trichloro-4,6-dinitrobenzene per 100 gallons. Example 51 of the invention contained both 25 pounds of 1,2,3-trichloro-4,6-dinitrobenzene and 301 pounds of cuprous oxide per 100 gallons of the paint.

The control paint failed in less than 1 month of exposure. Comparative paints 48, 49 and 50 also failed during the first month of exposure. In contrast, the paint 51 of the invention had an extended longevity or efficacy of at least 7 months, the paint still being effective at the close of the 7-month test.

TABLE VIII

| Example No | 47 (Control) | | 48 | | 49 | | 50 | | 51 | |
|---|---|---|---|---|---|---|---|---|---|---|
| Amount | Lb. | Percent | Lb. | Percent | Lb. | Percent | Lb. | Percent | Lb. | Percent |
| 1,2,3-Trichloro-4,6-dinitrobenzene | | | 25 | 2.4 | 60 | 6.2 | 112 | 11.5 | 25 | 2.1 |
| Cuprous Oxide | | | | | | | | | 301 | 25 |
| Magnesium Silicate | 237 | 22.0 | 195 | 18.4 | 36 | 3.7 | | | 100 | 8.3 |
| Titanium Dioxide | 100 | 9.3 | 100 | 9.4 | 100 | 10.3 | 100 | 10.3 | 100 | 8.3 |
| Vinyl acetate copolymer binder | 147 | 13.6 | 147 | 13.8 | 147 | 15.1 | 147 | 15.2 | 147 | 12.2 |
| Water | 568 | 52.5 | 568 | 53.4 | 603 | 62.0 | 585 | 60.3 | 604 | 50.2 |
| Dispersing agents [1] | 27 | 2.5 | 27 | 2.5 | 27 | 2.8 | 27 | 2.8 | 27 | 2.2 |
| Total | 1,079 | 100 | 1,062 | 100 | 973 | 100 | 971 | 100 | 1,204 | 100 |

[1] See footnote, Table VII.

| Months' Exposure | Percent Prevention of Fouling | | | | |
|---|---|---|---|---|---|
| 1 | 0 | 0 | 0 | 0 | 100 |
| 2 | 0 | 0 | 0 | 0 | 87 |
| 3 | 0 | 0 | 0 | 0 | 91 |
| 4 | 0 | 0 | 0 | 0 | 91 |
| 5 | 0 | 0 | 0 | 0 | 100 |
| 6 | 0 | 0 | 0 | 0 | 100 |
| 7 | 0 | 0 | 0 | 0 | 100 |

The data in Tables VII and VIII demonstrate that the water-thinned paints of the instant invention are surprisingly and most unexpectedly effective in protecting underwater surfaces from marine fouling organisms. By analogy with organic solvent-thinned paints, 200 pounds and 300 pounds cuprous oxide should protect against fouling for 4 months and 5 months, respectively. The water-thinned paints of the invention, however, were still highly effective against fouling at the end of a 7-months' exposure period.

It will be appreciated that various modifications and changes may be made in the compositions of the invention by those skilled in the art without departing from the spirit of the invention in addition to those described above and accordingly the invention is to be limited only within the scope of the appended claims.

What is claimed is:

1. A composite marine antifouling agent for a marine antifouling paint composition which protects underwater surfaces from marine fouling organisms consisting of 1,2,3-trichloro-4,6-dinitrobenzene and cuprous oxide in the proportions of from about 25 to about 300 parts by weight of 1,2,3-trichloro-4,6-dinitrobenzene and from about 200 to about 300 parts by weight of cuprous oxide.

2. A marine antifouling paint composition for protecting underwater surfaces from marine fouling organisms containing pigment, film forming paint base, diluent and as a composite marine antifouling agent from about 2% to about 20% by weight of 1,2,3-trichloro-4,6-dinitrobenzene and from about 16% to about 30% by weight of cuprous oxide.

3. A marine antifouling organic solvent-thinned paint composition for protecting underwater surfaces from marine fouling organisms containing pigment, film forming paint base, volatile solvent and as a composite marine antifouling agent from about 4% to about 17% by weight of 1,2,3-trichloro-4,6-dinitrobenzene and from about 16% to about 25% by weight of cuprous oxide.

4. A marine antifouling water-thinned paint composition for protecting underwater surfaces from marine fouling organisms containing pigment, film forming paint base, water and as a composite marine antifouling agent from about 2% to about 10% by weight of 1,2,3-trichloro-4,6-dinitrobenzene and from about 17% to about 30% by weight of cuprous oxide.

5. A marine antifouling paint composition for protecting underwater surfaces from marine fouling organisms containing from about 8% to about 31% by weight of pigment, from about 29% to about 40% by weight of film forming paint base, from about 13% to about 21% by weight of volatile solvent, and as a composite marine antifouling agent from about 4% to about 17% by weight of 1,2,3-trichloro-4,6-dinitrobenzene and from about 16% to about 25% by weight of cuprous oxide.

6. A marine antifouling paint composition as set forth in claim 5 wherein the film forming paint base is a rosin composition consisting of rosin and the hydrogenated methyl ester of rosin in proportions of 2.3:1 to 3.5:1.

7. A marine antifouling paint composition for protecting underwater surfaces from marine fouling organisms containing from about 5% to about 10% by weight of pigment, from about 10% to about 20% by weight of film forming paint base, from about 40% to about 60% by weight of water, and as a composite marine antifouling agent from about 2% to about 10% by weight of 1,2,3-trichloro-4,6-dinitrobenzene and from about 17% to about 30% by weight of cuprous oxide.

8. In a process for applying to underwater surfaces a paint composition containing pigment, film forming paint base and volatile solvent, the improvement which comprises adding as a composite marine antifouling agent from about 4% to about 17% by weight of 1,2,3-trichloro-4,6-dinitrobenzene and from about 16% to about 25% by weight of cuprous oxide to the paint composition to provide a marine antifouling paint composition for protecting the surfaces from marine fouling organisms.

9. In a process for applying to underwater surfaces a paint composition containing pigment, film forming paint base and water, the improvement which comprises adding as a composite marine antifouling agent from about 2% to about 10% by weight of 1,2,3-trichloro-4,6-dinitrobenzene and from about 17% to about 30% by weight of cuprous oxide to the paint composition to provide a marine antifouling paint composition for protecting the surfaces from marine fouling organisms.

10. A marine antifouling paint composition for protecting underwater surfaces from marine fouling organisms containing about 24 parts by weight of magnesium silicate, about 8 parts by weight of red iron oxide, about 25 parts by weight of gum rosin, about 7 parts by weight of the hydrogenated methyl ester of rosin, about 17 parts by weight of mineral spirits, and as a composite marine antifouling agent about 4 parts by weight of 1,2,3-trichloro-4,6-dinitrobenzene and about 16 parts by weight of cuprous oxide.

11. A marine antifouling paint composition for protecting underwater surfaces from marine fouling organisms containing about 4 parts by weight of magnesium silicate, about 9 parts by weight of red iron oxide, about 27 parts my weight of gum rosin, about 8 parts by weight of the hydrogenated methyl ester of rosin, about 18 parts by weight of mineral spirits, and as a composite marine antifouling agent about 17 parts my weight of 1,2,3-trichloride-4,6-dinitrobenzene and about 17 parts by weight of cuprous oxide.

12. A marine antifouling paint composition for protecting underwater surfaces from marine fouling organisms containing about 19 parts by weight of magnesium silicate, about 8 parts by weight of red iron oxide, about 24 parts by weight of gum rosin, about 10 parts by weight of the hydrogenated methyl ester of rosin, about 13 parts by weight of mineral spirts, and as a composite marine antifouling agent about 4 parts by weight of 1,2,3-trichloro-4,6-dinitrobenzene and about 22 parts by weight of cuprous oxide.

13. A marine antifouling paint composition for protecting underwater surfaces from marine fouling organisms containing about 19 parts by weight of magnesium silicate, about 7 parts by weight of red iron oxide, about 24 parts by weight of gum rosin, about 7 parts by weight of the hydrogenated methyl ester of rosin, about 16 parts by weight of mineral spirits, and as a composite marine antifouling agent about 4 parts by weight of 1,2,3-trichloro-4,6-dinitrobenzene and about 23 parts by weight of cuprous oxide.

14. A marine antifouling paint composition for protecting underwater surfaces from marine fouling organisms containing about 13 parts by weight of magnesium silicate, about 8 parts by weight of red iron oxide, about 24 parts by weight of gum rosin, about 10 parts by weight of the hydrogenated methyl ester of rosin, about 14 parts by weight of mineral spirits, and as a composite marine antifouling agent about 8 parts by weight of 1,2,3-trichloro-4,6-dinitrobenzene and about 23 parts by weight of cuprous oxide.

15. A marine antifouling paint composition for protecting underwater surfaces from marine fouling organisms containing about 13 parts by weight of magnesium silicate, about 8 parts by weight of red iron oxide, about 24 parts by weight of gum rosin, about 7 parts by weight of the hydrogenated methyl ester of rosin, about 17 parts by weight of mineral spirits, and as a composite marine antifouling agent about 8 parts by weight of 1,2,3-trichloro-4,6-dinitrobenzene and about 23 parts by weight of cuprous oxide.

16. A marine antifouling paint composition for protecting underwater surfaces from marine fouling organisms containing about 8 parts by weight of red iron oxide, about 22 parts by weight of gum rosin, about 11 parts by weight of the hydrogenated methyl ester of rosin, about 17 parts by weight of mineral spirits, and as a composite marine antifouling agent about 17 parts by weight of 1,2,3-trichloro-4,6-dinitrobenzene and about 25 parts by weight of cuprous oxide.

17. A marine antifouling paint composition for protecting underwater surfaces from marine fouling organisms containing about 8 parts by weight of red iron oxide, about 26 parts by weight of gum rosin, about 7 parts by weight of the hydrogenated methyl ester of rosin, about 18 parts by weight of mineral spirits, and as a composite marine antifouling agent about 16 parts by weight of 1,2,3-trichloro-4,6-dinitrobenzene and about 25 parts by weight of cuprous oxide.

18. A marine antifouling paint composition for protecting underwater surfaces from marine fouling organisms containing about 11 parts by weight of vinyl acetate polymer, about 56 parts by weight of water, about 9 parts by weight of titanium dioxide, and as a composite marine antifouling agent about 4 parts by weight of 1,2,3-trichloro-4,6-dinitrobenzene and about 18 parts by weight of cuprous oxide.

19. A marine antifouling paint composition for protecting underwater surfaces from marine fouling organisms containing about 10 parts by weight of vinyl acetate polymer, about 53 parts by weight of water, about 8 parts by weight of titanium dioxide, and as a composite marine antifouling agent about 2 parts by weight of 1,2,3-trichloro-4,6-dinitrobenzene and about 25 parts by weight of cuprous oxide.

20. A marine antifouling paint composition for protecting underwater surfaces from marine fouling organisms containing about 12 parts by weight of vinyl acetate polymer, about 51 parts by weight of water, about 8 parts by weight of titanium dioxide, and as a composite marine antifouling agent about 2 parts by weight of 1,2,3-trichloro-4,6-dinitrobenzene and about 25 parts by weight of cuprous oxide.

References Cited
UNITED STATES PATENTS

| | | | |
|---|---|---|---|
| 2,579,610 | 12/1951 | Pitre et al. | 106—15 XR |
| 2,786,795 | 3/1957 | Ligett et al. | 167—30 |
| 2,989,407 | 6/1961 | Francis | 106—17 |

ALEXANDER H. BRODMERKEL, *Primary Examiner.*

MORRIS LIEBMAN, *Examiner.*

L. HAYES, *Assistant Examiner.*